(12) United States Patent
Namekawa (10) Patent No.: US 8,928,302 B2
(45) Date of Patent: Jan. 6, 2015

(54) STEP-UP/DOWN TYPE POWER SUPPLY CIRCUIT

(71) Applicant: Kabushiki Kaisha Toshiba, Minato-ku, Tokyo (JP)

(72) Inventor: Toshimasa Namekawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 149 days.

(21) Appl. No.: 13/781,315

(22) Filed: Feb. 28, 2013

(65) Prior Publication Data

US 2014/0084882 A1   Mar. 27, 2014

(30) Foreign Application Priority Data

Sep. 21, 2012   (JP) ................................. 2012-208855

(51) Int. Cl.
| | |
|---|---|
| G05F 1/00 | (2006.01) |
| G05F 1/565 | (2006.01) |
| G05F 1/573 | (2006.01) |
| G05F 1/46 | (2006.01) |

(52) U.S. Cl.
CPC ........................................ G05F 1/46 (2013.01)
USPC ........... 323/285; 323/222; 323/271; 323/275; 323/277; 323/282; 323/283

(58) Field of Classification Search
CPC ............ G05F 1/46; G05F 1/10; H02M 3/156; H02M 2001/0032
USPC .................. 323/222–225, 271–277, 281–288
See application file for complete search history.

(56) References Cited

U.S. PATENT DOCUMENTS

| | | | |
|---|---|---|---|
| 5,402,060 A | 3/1995 | Erisman | |
| 5,949,224 A | 9/1999 | Barkarö | |
| 7,116,085 B2 | 10/2006 | Ikezawa | |
| 7,768,245 B1 * | 8/2010 | De Cremoux | ................ 323/259 |
| 7,928,796 B2 | 4/2011 | Namekawa | |

(Continued)

FOREIGN PATENT DOCUMENTS

| | | |
|---|---|---|
| JP | 2005-192312 A | 7/2005 |
| JP | 2010-148214 A | 7/2010 |

(Continued)

*Primary Examiner* — Timothy J Dole
*Assistant Examiner* — Yusef Ahmed
(74) *Attorney, Agent, or Firm* — Holtz, Holtz, Goodman & Chick PC (57) ABSTRACT

A first added signal that is acquired by adding a reference current signal that is in proportion to a current flowing through an inductance element, a slope compensation signal and a voltage difference signal that is in proportion to a difference between an input voltage and an output voltage and a second added signal that is acquired by adding the reference current signal and the slope compensation signal are compared with a difference signal of a voltage that is in proportion to the output voltage and a predetermined reference voltage, and pulse widths of driving pulse signals of a step-down switching circuit and a step-up switching circuit are controlled as a result of the comparison.

20 Claims, 6 Drawing Sheets

(56) References Cited

U.S. PATENT DOCUMENTS

| | | | |
|---|---|---|---|
| 8,085,005 B2 * | 12/2011 | Dearn | 323/222 |
| 8,305,055 B2 * | 11/2012 | Wu et al. | 323/259 |
| 8,686,702 B2 * | 4/2014 | Engelhardt | 323/282 |
| 8,816,657 B2 * | 8/2014 | Wang | 323/272 |
| 2007/0013356 A1 * | 1/2007 | Qiu et al. | 323/288 |
| 2007/0216372 A1 * | 9/2007 | Weng et al. | 323/222 |
| 2009/0201000 A1 * | 8/2009 | Kojima et al. | 323/282 |
| 2009/0273325 A1 * | 11/2009 | Nakahashi et al. | 323/282 |
| 2010/0148740 A1 * | 6/2010 | Saitoh | 323/283 |
| 2011/0043175 A1 * | 2/2011 | Sohma | 323/282 |
| 2012/0201065 A1 * | 8/2012 | Nate et al. | 363/126 |
| 2012/0242314 A1 | 9/2012 | Namekawa et al. | |
| 2012/0299568 A1 * | 11/2012 | Kumagai et al. | 323/282 |

FOREIGN PATENT DOCUMENTS

| | | |
|---|---|---|
| JP | 2010-158116 A | 7/2010 |
| JP | 2011-065659 A | 3/2011 |
| JP | 2012-205342 A | 10/2012 |

* cited by examiner

STEP-UP/DOWN TYPE POWER SUPPLY CIRCUIT

CROSS-REFERENCE TO RELATED APPLICATIONS

This application is based upon and claims the benefit of priority from Japanese Patent Application No. 2012-208855, filed on Sep. 21, 2012; the entire contents of which are incorporated herein by reference.

FIELD

Embodiments described herein relate to a step-up/down type power supply circuit that converts a DC input voltage into an arbitrary DC output voltage.

BACKGROUND

Conventionally, technologies relating to step-up/down type power supply circuits that convert a DC input voltage into an arbitrary DC output voltage have been developed, for example, in order to suppress ripples of an output voltage, technologies for decreasing a peak-to-peak value of a current flowing through an inductance element and technologies for switching between a step-up operation and a step-down operation in accordance with a current flowing through an inductance element have been disclosed.

However, according to the conventional technologies, there is room for the improvement of an operation responding to an abrupt change in the load or the continuity at the time of switching between a step-down operation/a step-up/down operation/a step-up operation.

DETAILED DESCRIPTION

In general, according to one embodiment, a step-up/down type power supply circuit includes a step-down switching circuit, a step-up switching circuit, an inductance element that is connected between the step-down switching circuit and the step-up switching circuit, a unit that compares a voltage that is in proportion to an output voltage and a predetermined reference voltage with each other and outputs a difference signal of the voltage and the predetermined reference voltage, a unit that outputs a current feedback signal that is in proportion to a current flowing through the inductance element, a clock signal generating unit that generates a clock signal, a unit that generates a sawtooth wave signal having a predetermined slope in synchronization with the clock signal, a unit that outputs a voltage difference signal that is in proportion to a difference between the input voltage and the output voltage, a unit that outputs a first added signal acquired by adding the sawtooth wave signal and the voltage difference signal to the current feedback signal, a unit that outputs a second added signal acquired by adding the sawtooth wave signal to the current feedback signal, a unit that compares the difference signal and the first added signal and outputs a first timing signal when the first added signal is larger than the difference signal, a unit that compares the difference signal and the second added signal and outputs a second timing signal when the second added signal is larger than the difference signal, and a control logic circuit that generates driving pulse signals of the step-down switching circuit and the step-up switching circuit based on the clock signal, the first timing signal and the second timing signal.

Exemplary embodiments of a step-up/down type power supply circuit will be explained below in detail with reference to the accompanying drawings. The present invention is not limited to the following embodiments.

Figure 1:
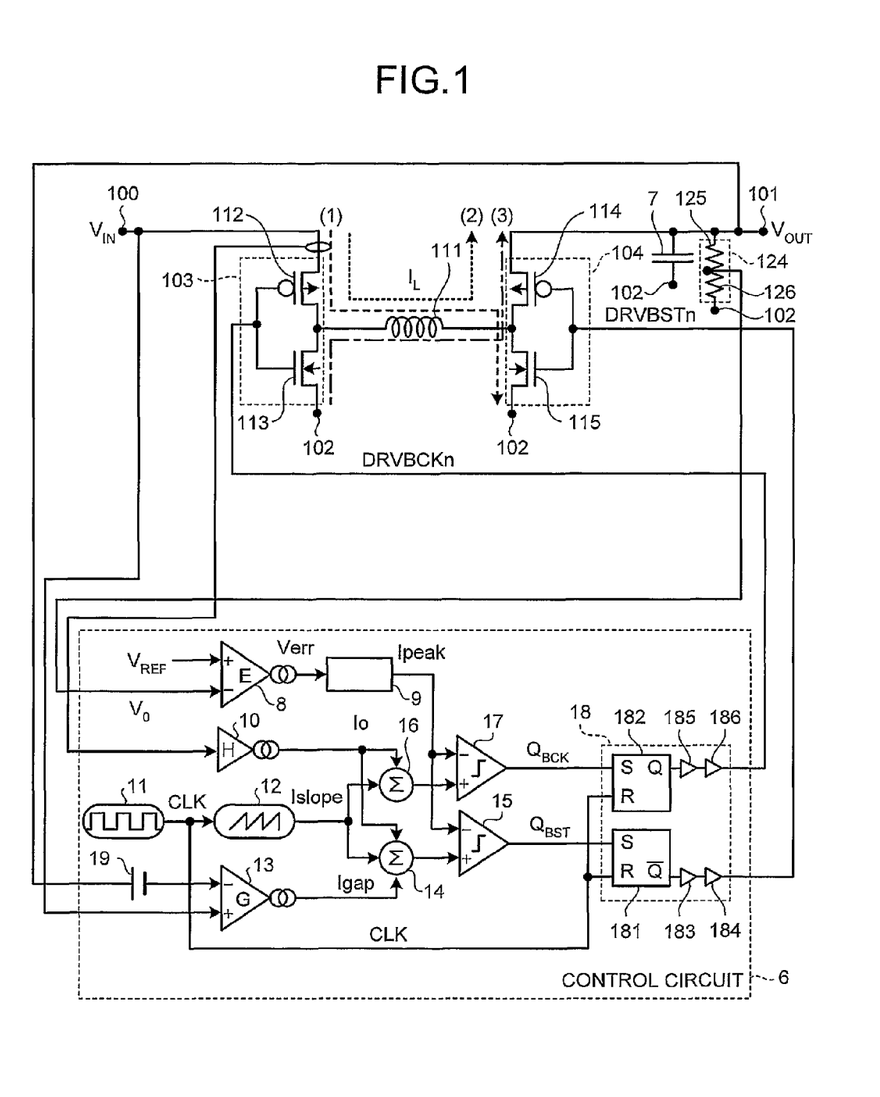
FIG. 1 is a diagram that illustrates the configuration of a step-up/down type power supply circuit according to a first embodiment.

FIG. 1 is a circuit diagram that illustrates the configuration of a step-up/down type power supply circuit according to a first embodiment. An input voltage (VIN) is applied to a first terminal 100, and a ground voltage (VSS) is applied to a second terminal 102. A step-down switching circuit 103 is connected between the first terminal 100 and the second terminal 102. The step-down switching circuit 103 includes a first PMOS transistor 112 having the source connected to the first terminal 100 and the drain connected to one end of an inductance element 111, and a first NMOS transistor 113 having the source connected to the second terminal 102 and the drain connected to one end of the inductance element 111. A step-up switching circuit 104 is connected between an output terminal 101 and the second terminal 102. The step-up switching circuit 104 includes a second PMOS transistor 114 having the source connected to the output terminal 101 and the drain connected to the other end of the inductance element 111, and a second NMOS transistor 115 having the source connected to the second terminal 102 and the drain connected to the other end of the inductance element 111. An output capacitor 7 is connected to the output terminal 101.

A control circuit 6 includes an error amplifier 8 that is supplied with a reference voltage (VREF) and an output feedback voltage (VO), and the output is supplied to a phase compensator 9. The output feedback voltage (VO) is acquired as a voltage that is in proportion to an output voltage (VOUT) by dividing the output voltage (VOUT) using a voltage dividing circuit 124 that is formed by resistors 125 and 126 that are connected between the output terminal 101 and the second terminal 102. The phase compensator 9 is necessary for securing the stability of a negative-feedback control system, receives an error output (Verr) as an input, and outputs a peak current signal (Ipeak) that indicates an inductor current amount that is necessary at that time. For example, the phase compensator 9 is configured by a series circuit (not illustrated in the figure) of a resistor and a capacitor that are connected between the output terminal of the error amplifier 8 and the second terminal 102. The peak current signal (Ipeak) is increased or decreased such that the output feedback voltage (VO) acquired as a voltage that is in proportion to the output voltage (VOUT) and the reference voltage (VREF) are the same. An inductor current amplifier 10 outputs a current feedback signal (Io) that is in proportion to a current flowing through the source of the first PMOS transistor 112. For example, the current feedback signal (Io) is detected by detecting a voltage between the source and the drain of the first PMOS transistor 112 using the inductor current amplifier 10 that is configured by a differential amplifier as a source current of the first PMOS transistor 112, consequently a signal that is in proportion to an inductor current (IL) flowing through the inductance element 111.

An oscillator 11 outputs a clock signal (CLK) that is used for controlling the switching frequency of the step-up/down type power supply circuit. The clock signal (CLK) is supplied to a control logic circuit 18 and a slope compensation sawtooth wave generator 12. The slope compensation sawtooth wave generator 12 is arranged so as to prevent subharmonic oscillation that is an inherent problem of a negative-feedback control system of a current program mode and generates a slope compensation signal (Islope) having a predetermined slope in synchronization with the clock signal (CLK). The slope compensation sawtooth wave generator 12 may be configured to generate a slope compensation signal (Islope) having a predetermined slope and generates a clock signal (CLK) that is synchronized with the slope compensation signal (Islope). In any of the cases, a clock signal (CLK) having a predetermined cycle and a slope compensation signal (Islope) having a predetermined slope that is synchronized with the clock signal (CLK) are generated.

An input-output voltage gap amplifier 13 compares an input voltage (VIN) and an output voltage (VOUT) with each other and outputs a gap signal (Igap) that is in proportion to the voltage difference thereof. The input voltage (VIN) is applied to a non-inverted input terminal of the input-output voltage gap amplifier 13, and the output voltage (VOUT) is applied to an inverted input terminal through an offset voltage source 19. The gap signal (Igap) can be adjusted in accordance with a voltage value of the offset voltage source 19. A threshold value for a transition of the step-up/down power supply circuit from a step-up operation to a step-up/down operation changes in accordance with the gap signal (Igap), and accordingly, by adjusting the voltage value of the offset voltage source 19, the threshold voltage for a transition from a step-up operation to a step-up/down operation is adjusted.

The current feedback signal (Io), the slope compensation signal (Islope) and the gap signal (Igap) are added by a first analog adder 14, and the first analog adder 14 outputs a first analog signal (Io+Islope+Igap) that is acquired by adding the current feedback signal (Io), the slope compensation signal (Islope) and the gap signal (Igap). The first analog signal is supplied to a first comparator 15 and is compared with the peak current signal (Ipeak). The first comparator 15 detects that the first analog signal (Io+Islope+Igap) arrives at the peak current signal (Ipeak) and outputs a first timing signal (QBST) at that moment. The current feedback signal (Io) supplied from the inductor current amplifier 10 and the slope compensation signal (Islope) are added together by a second analog adder 16, and the second analog adder 16 outputs a second analog signal (Io+Islope) that is acquired by adding the current feedback signal (Io) and the slope compensation signal (Islope). A second comparator 17 compares the second analog signal and the peak current signal (Ipeak) with each other and detects that the second analog signal (Io+Islope) arrives at the peak current signal (Ipeak) and outputs a second timing signal (QBCK) at that moment.

The control logic circuit 18 includes an RS latch circuit 181 that receives the first timing signal (QBST) supplied from the first comparator 15 and the clock signal (CLK) as inputs, and an RS latch circuit 182 that receives the second timing signal (QBCK) supplied from the second comparator 17 and the clock signal (CLK) as inputs. An inverted output of the RS latch circuit 181 is supplied to the step-up switching circuit 104 through two-stage amplifiers 183 and 184 as a first driving pulse (DRVBSTn). A non-inverted output of the RS latch circuit 182 is supplied to the step-down switching circuit 103 through two-stage amplifiers 185 and 186 as a second driving pulse (DRVBCKn).

By applying the first and second driving pulses (DRVBSTn) and (DRVBCKn), an operating status (1) in which the first PMOS transistor 112 of the step-down switching circuit 103 and the second NMOS transistor 115 of the step-up switching circuit 104 are turned on, similarly, an operating state (2) in which the first PMOS transistor 112 of the step-down switching circuit 103 and the second PMOS transistor 114 of the step-up switching circuit 104 are turned on, and an operating state (3) in which the first NMOS transistor 113 of the step-down switching circuit 103 and the second PMOS transistor 114 of the step-up switching circuit 104 are turned on are formed. In the operating state (1), a current flowing to the inductance element 111 increases. In the operating state (2), an increase/decrease in the current flowing to the inductance element 111 changes based on the high/low relation between the input voltage (VIN) and the output voltage (VOUT). In the operating state (3), the current flowing to the inductance element 111 decreases.

Figure 2:
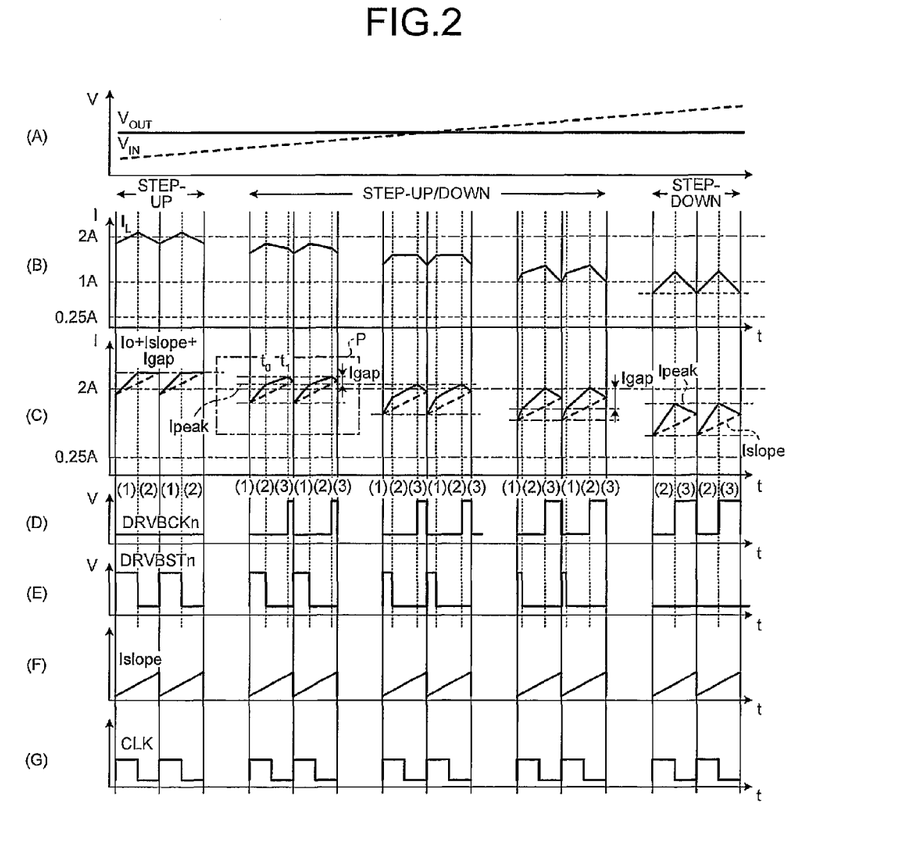
FIGS. 2A to 2G are diagrams that illustrate operating waveforms according to the first embodiment.

FIGS. 2A to 2G are diagrams that illustrate operating waveforms according to the first embodiment illustrated in FIG. 1. FIG. 2A illustrates voltage relation between the input voltage (VIN) and the output voltage (VOUT). As illustrated in the figure, in a case where the output voltage (VOUT) is sufficiently higher than the input voltage (VIN), a step-up operation is performed. When the input voltage becomes sufficiently higher than the output voltage, the operation is switched to a step-down operation. In addition, in a range in which a difference between the input voltage and the output voltage is small, a step-up/down operation is performed.

FIG. 2B illustrates an inductor current (IL). The inductor current (IL) has a waveform that is acquired by composing an inductor average current |IL| and a ripple component that occurs in accordance with a switching operation. FIG. 2C illustrates the relation between the first analog signal (Io+Islope+Igap) and the peak current signal (Ipeak). For reference, the slope compensation signal (Islope) is denoted by a dotted line. FIG. 2D illustrates a second driving pulse (DRVBCKn) that is supplied to the step-down switching circuit 103. The second driving pulse (DRVBCKn) appears when the second analog signal (Io+Islope) arrives at the peak current signal (Ipeak) and is reset in accordance with the clock signal (CLK).

In a case where the output voltage (VOUT) is sufficiently higher than the input voltage (VIN), in the operating state (2) in which the first driving pulse (DRVBSTn) is in the low state, the inductor current gradually decreases based on the high/low relation between the input voltage (VIN) and the output voltage (VOUT). Accordingly, before the second analog signal (Io+Islope) arrives at the peak signal (Ipeak), the RS latch circuit 182 is reset in accordance with the clock signal (CLK). As a result, the second driving pulse (DRVBCKn) is not generated, and a step-up operation is performed by a switching operation of the step-up switching circuit 104.

FIG. 2E illustrates the first driving pulse (DRVBSTn) that is supplied to the step-up switching circuit 104. The first driving pulse (DRVBSTn) appears on a rising edge of the clock signal (CLK) and appears as a signal that is reset when the first analog signal (Io+Islope+Igap) arrives at the peak current signal (Ipeak). During one cycle of the clock signal (CLK), a step-up/down operation is performed in a range in which both the first driving pulse (DRVBSTn and the second driving pulse (DRVBCKn) are generated and are supplied to the step-up switching circuit 104 and the step-down switching circuit 103.

In a case where the input voltage (VIN) is sufficiently higher than the output voltage (VOUT), the gap signal (Igap) has a large value, and, at the time of being reset in accordance with the clock signal (CLK), the first analog signal (Io+Islope+Igap) is in the state of arriving at the peak current signal (Ipeak), and accordingly, the first driving pulse (DRVBSTn) is not generated, whereby a step-down operation is performed in accordance with a switching operation of the step-down switching circuit 103.

FIG. 2F illustrates the slope compensation signal (Islope). The slope compensation signal (Islope) appears as a signal having a predetermined slope in synchronization with the clock signal (CLK) illustrated in FIG. 2G.

In FIG. 2D, numbers (1) to (3) correspond to the operating states of the step-up/down power supply circuit described with reference to FIG. 1. In other words, number (1) corresponds to an operation performed when the first PMOS transistor 112 of the step-down switching circuit 103 and the second NMOS transistor 115 of the step-up switching circuit 104 are turned on. In this operating state, an operation is performed in which the current flowing to the inductance element 111 increases. In addition, number (2) corresponds to an operation performed when the first PMOS transistor 112 of the step-down switching circuit 103 and the second PMOS transistor 114 of the step-up switching circuit 104 are turned on. In this operating state, the current flowing to the inductance element 111 increases or decreases based on the voltage relation between the input voltage (VIN) and the output voltage (VOUT). Furthermore, number (3) corresponds to an operation performed when the first NMOS transistor 113 of the step-down switching circuit 103 and the second PMOS transistor 114 of the step-up switching circuit 104 are turned on, and an operation is performed in which the current flowing to the inductance element 111 decreases.

As a result of comparing the peak current signal (Ipeak) with the first and second analog signals, the pulse widths of the first and second driving pulses (DRVBSTn) and (DRVBCKn) change. In this way, an increase/decrease in the current flowing to the inductance element 111 is adjusted in the step-up/step-up/down/step-down operations, whereby the output voltage (VOUT) is close to a desired voltage.

As illustrated in FIGS. 2D and 2E, in this embodiment, the pulse width of the driving pulse (DRVBCKn) or (DRVBSTn) supplied to the gate of the transistor of each switching circuit continuously changes at the time of switching between three operations of the step-up, step-up/down, and step-down operations. For example, when switching from the step-up operation to the step-up/down operation is performed, the pulse width of the second driving pulse (DRVBCKn) that is supplied to the step-down switching circuit 103 appears as a thin pulse width and gradually increases. On the other hand, the pulse width of the first driving pulse (DRVBSTn) that is supplied to the step-up switching circuit 104 gradually decreases. Similarly, when switching from the step-up/down operation to the step-down operation is performed, in this embodiment, the pulse width of the driving pulse (DRVBCKn) for the step-down switching circuit 103 gradually increases, and, to the contrary, the pulse width of the driving pulse (DRVBSTn) for the step-up switching circuit 104 continuously decreases.

According to this embodiment, the timing of the generation of the driving pulses (DRVBCKn) and (DRVBSTn) is controlled based on result of comparison between the peak current signal (Ipeak), the first analog signal (Io+Islope+Igap) and the second analog signal (Io+Islope). In other words, the timing is controlled using the peak current (Ipeak) and the gap signals (Igap) that are in proportion to differences between the first and second analog signal input voltages (VIN) and the output voltage (VOUT). By controlling the period of the operating state (2), in which the inductor current increases or decreases based on a difference between the input voltage (VIN) and the output voltage (VOUT), using the gap signal (Igap) that is in proportion to the difference between the input voltage (VIN) and the output voltage (VOUT), the period of the operating state (2) is configured to be constant. By performing this control operation, the pulse widths of the driving pulses (DRVBCKn) and (DRVBSTn) continuously change based on the voltage relation between the input voltage (VIN) and the output voltage (VOUT).

Here, it is important that the average current amount |IL| of the inductor current is approximately the same before and after the switching between the operations. When there is a difference in the average current amount |IL| of the inductor current, the load current becomes excessive or insufficient. The excessive current or the insufficient current causes the output capacitor 7 to be charged or discharged, and accordingly, the output power source voltage (VOUT) varies. According to this embodiment, the operations of the step-up switching circuit and the step-down switching circuit are controlled in accordance with the driving pulses (DRVBCKn) and (DRVBSTn) of which the pulse widths continuously change. In other words, in accordance with a period of the pulse width that continuously changes, the inductance element is charged or discharged. Accordingly, before and after the switching between operations, the average current amount |IL| of the inductor current is approximately the same, and therefore, variations in the output power source voltage (VOUT) are suppressed.

The switching between operations is performed based on comparison between the peak current signal (Ipeak), the first analog signal (Io+Islope+Igap) and the second analog signal (Io+Islope). When the output voltage (VOUT) changes in accordance with a variation in the load, the changes appear in the gap signal (Igap) that represents a difference between the input voltage (VIN) and the output voltage (VOUT) and the peak current signal (Ipeak) that is acquired by comparing the output voltage (VOUT) with the reference voltage (VREF) with each other. Since the switching between operations is performed in accordance with a result of comparison between the peak current signal (Ipeak) and the first and second analog signals including the current feedback signal (Io) that is in proportion to the inductor current (IL), which is performed every cycle of the clock signal (CLK), the response to the variation in the load is speedy.

At the time of the operating state of the step-up/down operation (2), in other words, at a time when the first PMOS transistor 112 of the step-down switching circuit 103 and the second PMOS transistor 114 of the step-up switching circuit 104 are turned on, a current is directly supplied from the input voltage (VIN) side to the output voltage (VOUT) side through the inductance element 111. Particularly, when the input voltage (VIN) and the output voltage (VOUT) have electric potentials that are almost the same, a current of a predetermined amount continuously flows through the inductance element 111. Since this state is present, a peak value of the inductor current (IL) is suppressed as being low, whereby a loss that is consumed by the inductance element 111 is suppressed.

Figure 3:
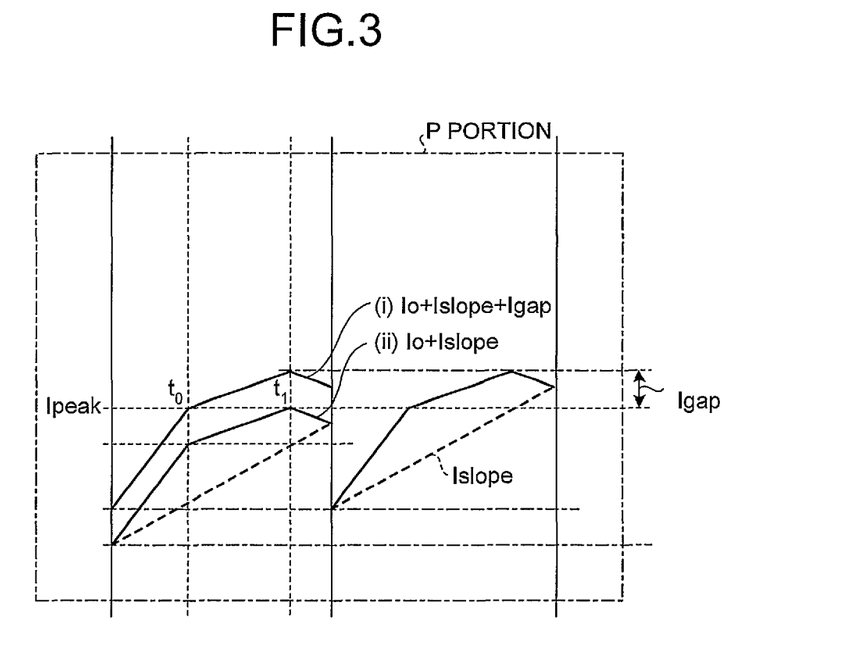
FIG. 3 is an enlarged diagram of a portion (P portion) of the operating waveform illustrated in FIG. 2C for illustrating the operation according to the first embodiment.

The description of the operation according to the first embodiment will be supplemented with reference to FIG. 3. FIG. 3 is acquired by enlarging a P portion illustrated in FIG.

2C. While a waveform that illustrates the first analog signal (Io+Islope+Igap), that is, waveform (i) is illustrated in FIG. 2C, for the description of the operation, waveform (ii) that illustrates the second analog signal (Io+Islope) is additionally displayed. At timing (t0) when the first analog signal (Io+Islope+Igap) arrives at the peak current signal (Ipeak), the first driving pulse (DRVBSTn) is reset. Then, at timing (t1) when the second analog signal (Io+Islope) arrives at the peak current signal (Ipeak), the second driving pulse (DRVBCKn) appears and is reset in accordance with the clock signal (CLK). The comparisons between the first analog signal (Io+Islope+Igap) and the second analog signal (Io+Islope) and the peak current signal (Ipeak) are performed by the first comparator 15 and the second comparator 17 that have been described in the configuration illustrated in FIG. 1.

Figure 4:
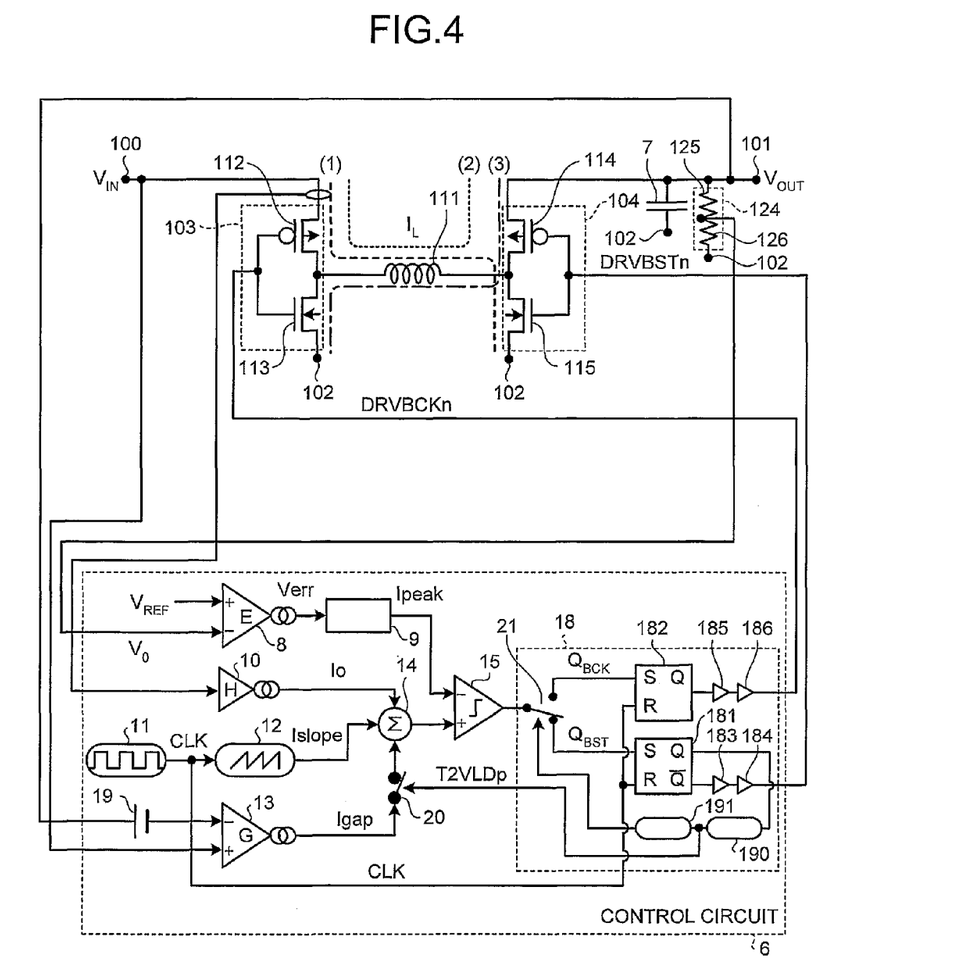
FIG. 4 is a diagram that illustrates the configuration of a step-up/down type power supply circuit according to a second embodiment.

FIG. 4 illustrates a step-up/down type power supply circuit according to a second embodiment. The same reference sign is assigned to a constituent element that corresponds to a constituent element, which represents the first embodiment, illustrated in FIG. 1, and duplicate description will be avoided. In this embodiment, a gap signal (Igap) of an input-output voltage gap amplifier 13 is supplied to a first analog adder 14 through a switch 20. The switch 20 is controlled in accordance with a control signal (T2VLDp) that is supplied from a control logic circuit 18. An output signal of the first analog adder 14 is supplied to a first comparator 15. An output signal of the first comparator 15 is supplied to RS latch circuits 181 and 182 through a change-over switch 21. A non-inverted output of the RS latch circuit 181 is supplied to the switch 20 through a delay circuit 190 as a control signal (T2VLDp) of the switch 20. An output of the delay circuit 190 is supplied to the change-over switch 21 further through a delay circuit 191 as a switching signal. The delay times of the delay circuits 190 and 191 are appropriately set for the control of the operating timing.

At the time of starting the operation, the switch 20 is turned on, a gap signal (Igap) of the input-output voltage gap amplifier 13 is supplied to the first analog adder 14 through the switch 20, and the first analog adder 14 outputs a first analog signal (Io+Islope+Igap) that is acquired by adding a current feedback signal (Io), a slope compensation signal (Islope) and the gap signal (Igap) together. An output of the first analog adder 14 is supplied to the first comparator 15. The first comparator 15 compares a peak current signal (Ipeak) that represents an inductor current amount and the first analog signal (Io+Islope+Igap) with each other, detects that the first analog signal (Io+Islope+Igap) arrives at the peak current signal (Ipeak), and outputs a first timing signal (QBST). At the time of staring the operation, the change-over switch 21 is connected to the RS latch circuit 181 side, and the first timing signal (QBST) is supplied to the RS latch circuit 181. An inverted output of the RS latch circuit 181 is supplied to a step-up switching circuit 104 through two-stage amplifiers 183 and 184 as a first driving pulse (DRVBSTn).

The non-inverted output of the RS latch circuit 181 supplies a control signal (T2VLDp) that is used for controlling the switch 20 to the switch 20 through the delay circuit 190 after a predetermined delay time elapses, whereby the switch 20 is made into the Off state. An output of the delay circuit 190 is supplied to the change-over switch 21 through the second delay circuit 191. An output of the second delay circuit 191 switches the change-over switch 21 such that the state is controlled to a state in which the output of the first comparator 15 is supplied to the RS latch circuit 182.

By turning off the switch 20, the gap signal (Igap) supplied from the input-output voltage gap amplifier 13 is disengaged from the first analog adder 14. In this state, a second analog signal (Io+Islope) acquired by adding the current feedback signal (Io) supplied from an inductor current amplifier 10 and the slope compensation signal (Islope) is supplied from the first analog adder 14 to the first comparator 15 and is compared with the peak current signal (Ipeak). When the first comparator 15 detects that the second analog signal (Io+Islope) has arrived at the peak current signal (Ipeak), a second timing signal (QBCK) is output and is supplied to the RS latch circuit 182 through the change-over switch 21. A non-inverted output of the RS latch circuit 182 is supplied to the step-down switching circuit 103 through the two-stage amplifiers 185 and 186 as a second driving pulse (DRVBCKn).

FIGS. 5A to 5H are diagrams that illustrate operating waveforms according to the second embodiment. FIG. 5A illustrates voltage relation between the input voltage (VIN) and the output voltage (VOUT). As illustrated in the figure, in a case where the input voltage (VIN) is sufficiently lower than the output voltage (VOUT), a step-up operation is performed. When the output voltage becomes sufficiently lower than the input voltage, the operation is switched to a step-down operation. In addition, in a range in which a difference between the input voltage and the output voltage is small, a step-up/down operation is performed. FIG. 5B illustrates an inductor current (IL). As a current value of the inductor current becomes larger, it represents a higher-load state. FIG. 5C illustrates the state of the second analog signal (Io+Islope) and illustrates the appearance of a change thereof according to the inductor current IL.

FIG. 5D illustrates the state of the first analog signal (Io+Islope+Igap). In the second embodiment, the comparator is commonly used in a time division manner, and, when the first analog signal (Io+Islope+Igap) arrives at the peak current signal (Ipeak), a control operation of disengaging the gap signal (Igap) from the first analog adder 14 is performed. Accordingly, at this timing, the output of the first analog adder 14 decreases by a value that corresponds to the gap signal (Igap). This appearance is illustrated in FIG. 5D. In other words, at timing (t0) when the first analog signal (Io+Islope+Igap) arrives at the peak current signal (Ipeak), the output voltage of the first analog adder 14 decreases by a value that corresponds to the gap signal (Igap).

FIG. 5E illustrates the second driving pulse (DRVBCKn) that is supplied to the step-down switching circuit 103. The second driving pulse (DRVBCKn) appears when the second analog signal (Io+Islope) arrives at the peak current signal (Ipeak) and is reset in accordance with the clock signal (CLK). The output signal of the first analog adder 14 illustrated in FIG. 5D is switched to the output of the second analog signal (Io+Islope) at timing (t0), and accordingly, the second analog signal (Io+Islope) arrives at the peak current signal (Ipeak) at timing (t1). As illustrated in FIG. 5E, the second driving pulse (DRVBCKn) appears at timing (t1). The second driving pulse (DRVBCKn) is reset on the rising edge of the clock signal (CLK).

In a case where the output voltage (VOUT) is sufficiently higher than the input voltage (VIN), in the operating state (2) in which the first driving pulse (DRVBSTn) is in the low state, the inductor current gradually decreases based on the high/low voltage relation between the input voltage (VIN) and the output voltage (VOUT). Accordingly, before the second analog signal (Io+Islope) arrives at the peak signal (Ipeak), the RS latch circuit 182 is reset in accordance with the clock signal (CLK). As a result, the second driving pulse (DRVBCKn) is not generated, and a step-up operation is performed by a switching operation of the step-up switching circuit 104.

FIG. 5F illustrates the first driving pulse (DRVBSTn) that is supplied to the step-up switching circuit 104. The first driving pulse (DRVBSTn) appears as a result of comparison between the first analog signal (Io+Islope+Igap) and the peak current signal (Ipeak). The first driving pulse (DRVBSTn) appears on a rising edge of the clock signal (CLK) and is reset when the first analog signal (Io+Islope+Igap) arrives at the peak current signal (Ipeak). During one cycle of the clock signal (CLK), a step-up/down operation is performed in a range in which both the first driving pulse (DRVBSTn) and the second driving pulse (DRVBCKn) are generated and are supplied to the step-up switching circuit 104 and the step-down switching circuit 103. FIG. 5G illustrates the slope compensation signal (Islope), which has a predetermined slope, synchronized with the clock signal (CLK) illustrated in FIG. 5H.

In a case where the input voltage (VIN) is sufficiently higher than the output voltage (VOUT), the gap signal (Igap) has a large value, and, at the time of being reset in accordance with the clock signal (CLK), the first analog signal (Io+Islope+Igap) is in the state of arriving at the peak current signal (Ipeak), and accordingly, the first driving pulse (DRVBSTn) is not generated, whereby a step-down operation is performed in accordance with a switching operation of the step-down switching circuit 103.

In FIG. 5E, numbers (1) to (3) correspond to the operating states of the step-up/down power supply circuit. In other words, number (1) corresponds to an operation performed when the first PMOS transistor 112 of the step-down switching circuit 103 and the second NMOS transistor 115 of the step-up switching circuit 104 are turned on. In other words, an operation state is formed in which the current flowing to the inductance element 111 increases. In addition, number (2) illustrates an operating state in which the first PMOS transistor 112 of the step-down switching circuit 103 and the second PMOS transistor 114 of the step-up switching circuit 104 are turned on. In this operating state, the current flowing to the inductance element 111 increases or decreases based on the voltage relation between the input voltage (VIN) and the output voltage (VOUT). Furthermore, number (3) is an operating state in which the first NMOS transistor 113 of the step-down switching circuit 103 and the second PMOS transistor 114 of the step-up switching circuit 104 are turned on, and an operation state is formed in which the current flowing to the inductance element 111 decreases.

As illustrated in FIGS. 5E and 5F, also in this embodiment, the pulse width of the driving pulse (DRVBCKn) or (DRVBSTn) supplied to the gate of the transistor of each switching circuit continuously changes at the time of switching between three operations of the step-up, step-up/down and step-down operations. When switching from the step-up operation to the step-up/down operation is performed, the pulse width of the driving pulse (DRVBCKn) that is supplied to the step-down switching circuit 103 appears as a thin pulse width and gradually increases. On the other hand, the pulse width of the driving pulse (DRVBSTn) that is supplied to the step-up switching circuit 104 gradually decreases. Similarly, when switching from the step-up/down operation to the step-down operation is performed, the pulse width of the driving pulse (DRVBCKn) for the step-down switching circuit 103 gradually increases, and, to the contrary, the pulse width of the driving pulse (DRVBSTn) for the step-up switching circuit 104 continuously decreases. Accordingly, before and after the switching between operations, the average current amount |IL| of the inductor current is approximately the same, and therefore, variations in the output power source voltage (VOUT) are suppressed.

Figure 5:
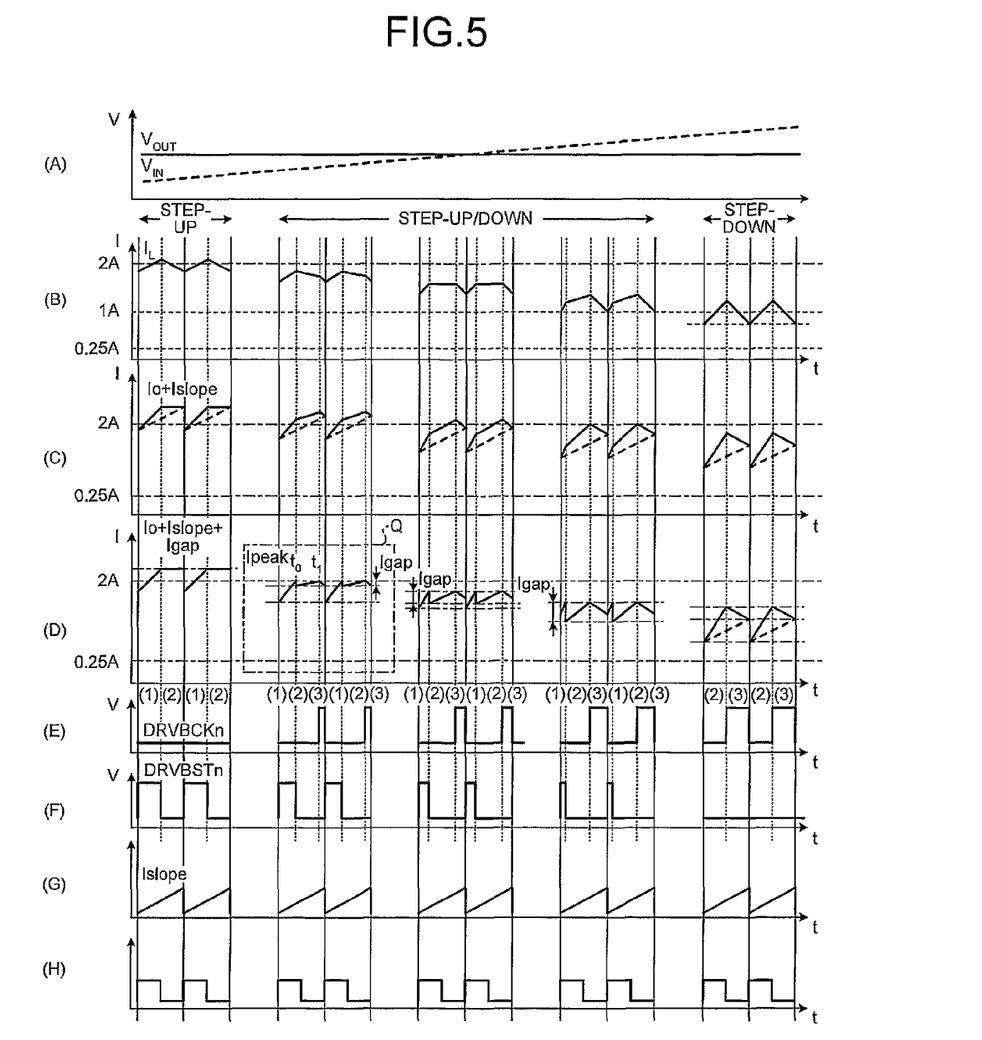
FIGS. 5A to 5H are diagrams that illustrate operating waveforms according to the second embodiment.
Figure 6:
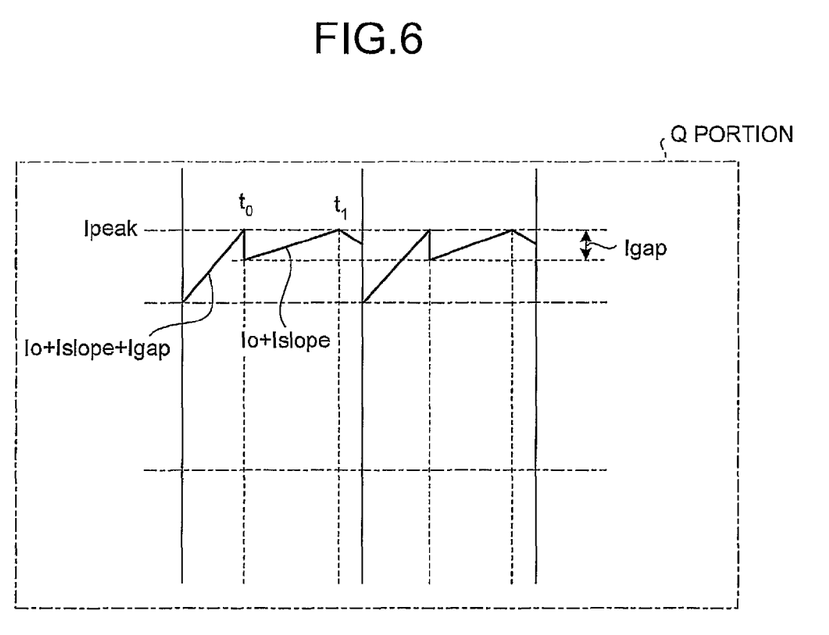
FIG. 6 is an enlarged diagram of a portion (Q portion) of the operating waveform illustrated in FIG. 5D for illustrating the operation according to the second embodiment.

FIG. 6 is an enlarged diagram of a portion (Q portion) of the operating waveform illustrated in FIG. 5 for illustrating the operation according to the second embodiment. In other words, FIG. 6 illustrates the appearance of a change in the first analog signal (Io+Islope+Igap) and corresponds to the output of the first analog adder 14. At timing (t0), the first analog signal (Io+Islope+Igap) arrives at the peak current signal (Ipeak). At this timing (t0), since a control operation of disengaging the gap signal (Igap) from the first analog adder 14 is performed, the first analog signal decreases by a value that corresponds to the gap signal (Igap) at timing (t0). In other words, after timing (t0), the second analog signal (Io+Islope) appears. At timing (t1), the second analog signal (Io+Islope) arrives at the peak current signal (Ipeak). At timing (t0), the first driving pulse (DRVBSTn) is reset so as to be in the low state, and the second driving pulse (DRVBCKn) appears at timing (t1).

According to the second embodiment, the comparator that compares the peak current signal (Ipeak) with the first analog signal (Io+Islope+Igap) acquired by adding the current feedback signal (Io), the slope compensation signal (Islope) and gap signal (Igap) together, and with the second analog signal (Io+Islope) acquired by adding the current feedback signal (Io) and the slope compensation signal (Islope) together is configured to be commonly used in a time division manner. Accordingly, an erroneous detection operation that is based on a difference in the circuit threshold, which may occur between comparators, is prevented. In addition, owing to the common use of the comparator, the number of components is decreased. Furthermore, since the analog adder that outputs the first and second analog signals is commonly used, the number of components can be decreased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A step-up/down type power supply circuit comprising:
   a first terminal to which an input voltage is applied;
   a second terminal to which a ground voltage is applied;
   an output terminal that outputs an output voltage;
   a step-down switching circuit that is connected between the first and second terminals;
   a step-up switching circuit that is connected between the output terminal and the second terminal;
   an inductance element that is connected between the step-down switching circuit and the step-up switching circuit;
   a unit that compares a voltage that is in proportion to the output voltage and a predetermined reference voltage with each other and outputs a difference signal of the voltage and the predetermined reference voltage;
   a unit that outputs a current feedback signal that is in proportion to a current flowing through the inductance element;
   a clock signal generating unit that generates a clock signal;
   a unit that generates a sawtooth wave signal having a predetermined slope in synchronization with the clock signal;
   a unit that outputs a voltage difference signal that is in proportion to a difference between the input voltage and the output voltage;

a unit that outputs a first added signal acquired by adding the sawtooth wave signal and the voltage difference signal to the current feedback signal;

a unit that outputs a second added signal acquired by adding the sawtooth wave signal to the current feedback signal;

a unit that compares the difference signal and the first added signal and outputs a first timing signal when the first added signal is larger than the difference signal;

a unit that compares the difference signal and the second added signal and outputs a second timing signal when the second added signal is larger than the difference signal; and a control logic circuit that generates driving pulse signals of the step-down switching circuit and the step-up switching circuit based on the clock signal, the first timing signal and the second timing signal.

2. The step-up/down type power supply circuit according to claim 1, wherein the step-down switching circuit includes a first MOS transistor having a source connected to the first terminal and a drain connected to one end of the inductance element and a second MOS transistor having a source connected to the second terminal and a drain connected to the one end of the inductance element, and wherein the step-up switching circuit includes a third MOS transistor having a source connected to the output terminal and a drain connected to the other end of the inductance element and a fourth MOS transistor having a source connected to the second terminal and a drain connected to the other end of the inductance element.

3. The step-up/down type power supply circuit according to claim 2, wherein the unit that outputs the current feedback signal detects a current that flows through the source of the first MOS transistor.

4. The step-up/down type power supply circuit according to claim 2, wherein, at the time of performing a step-up/down operation, a first state in which the first and fourth MOS transistors are turned on and the second and third MOS transistors are turned off, a second state in which the first and third MOS transistors are turned on and the second and fourth MOS transistors are turned off and a third state in which the second and third MOS transistors are turned on and the first and fourth MOS transistors are turned off are included.

5. The step-up/down type power supply circuit according to claim 4, wherein the unit that outputs the first added signal and the unit that outputs the second added signal are a common addition unit, initially, outputs the first added signal and outputs the second added signal after predetermined timing.

6. The step-up/down type power supply circuit according to claim 5, wherein the unit that outputs the first timing signal and the unit that outputs the second timing signal are a common timing signal output unit, outputs the first timing signal based on a result of comparison between the difference signal and the first added signal and outputs the second timing signal based on a result of comparison between the difference signal and the second added signal.

7. The step-up/down type power supply circuit according to claim 1, wherein the unit that outputs the first added signal and the unit that outputs the second added signal are a common addition unit, initially, outputs the first added signal and outputs the second added signal after predetermined timing.

8. The step-up/down type power supply circuit according to claim 7, wherein the unit that outputs the first timing signal and the unit that outputs the second timing signal are a common timing signal output unit, outputs the first timing signal based on a result of comparison between the difference signal and the first added signal and outputs the second timing signal based on a result of comparison between the difference signal and the second added signal.

9. A step-up/down type power supply circuit comprising:
a first terminal to which an input voltage is applied;
a second terminal to which a gound voltage is applied;
an output terminal that outputs an output voltage;
a step-down switching circuit that is connected between the first and second terminals;
a step-up switching circuit that is connected between the output terminal and the second terminal;
an inductance element that is connected between the step-down switching circuit and the step-up switching circuit;
an error amplifier that compares a voltage that is in proportion to the output voltage and a predetermined reference voltage with each other;
a phase compensator that is supplied with an output of the error amplifier and outputs a difference signal that is in proportion to a voltage difference between the output voltage and the reference voltage;
a current amplifier that outputs a current feedback signal that is in proportion to a current flowing through the inductance element;
a clock signal generating unit that generates a clock signal;
a unit that generates a sawtooth wave signal having a predetermined slope in synchronization with the clock signal;
a voltage comparator circuit that outputs a voltage difference signal that is in proportion to a difference between the input voltage and the output voltage;
a first analog adder that adds the current feedback signal, the sawtooth wave signal and the voltage difference signal together;
a second analog adder that adds the current feedback signal and the sawtooth wave signal together;
a first comparator that compares the difference signal and an output of the first analog adder with each other;
a second comparator that compares the difference signal and an output of the second analog adder with each other; and
a control logic circuit that generates driving pulse signals of the step-down switching circuit and the step-up switching circuit based on the clock signal, an output of the first comparator and an output of the second comparator.

10. The step-up/down type power supply circuit according to claim 9,
wherein the control logic circuit includes a first RS latch circuit that receives an output of the first comparator and the clock signal and a second RS latch circuit that receives an output of the second comparator and the clock signal,
wherein an output of the first RS latch circuit is used as the driving pulse signal of the step-up switching circuit, and
wherein an output of the second RS latch circuit is used as the driving pulse signal of the step-down switching circuit.

11. The step-up/down type power supply circuit according to claim 10, wherein an offset voltage source configured to adjust a threshold for a transition from a step-up operation to a step-up/down operation is connected to an input terminal of the voltage comparator circuit.

12. A step-up/down type power supply circuit comprising:
a first terminal to which an input voltage is applied;
a second terminal to which a ground voltage is applied;
an output terminal that outputs an output voltage;

a step-down switching circuit that is connected between the first and second terminals;

a step-up switching circuit that is connected between the output terminal and the second terminal;

an inductance element that is connected between the step-down switching circuit and the step-up switching circuit;

an error amplifier that compares a voltage that is in proportion to the output voltage and a predetermined reference voltage with each other;

a phase compensator that is supplied with an output of the error amplifier and outputs a difference signal that is in proportion to a voltage difference between the output voltage and the reference voltage;

a current amplifier that outputs a current feedback signal that is in proportion to a current flowing through the inductance element;

a clock signal generating unit that generates a clock signal;

a unit that generates a sawtooth wave signal having a predetermined slope in synchronization with the clock signal;

a voltage comparator circuit that outputs a voltage difference signal that is in proportion to a difference between the input voltage and the output voltage;

a switch that is controlled so as to be turned on or off in accordance with a predetermined control signal;

an analog adder that adds the current feedback signal, the sawtooth wave signal and the voltage difference signal that is supplied through the switch together;

a comparator that compares an output of the analog adder and the difference signal with each other; and a control logic circuit that generates driving pulse signals of the step-down switching circuit and the step-up switching circuit based on the clock signal and an output of the comparator.

13. The step-up/down type power supply circuit according to claim 12, wherein the control logic circuit includes first and second RS latch circuits and a change-over switch that switches and connects the output of the comparator to the first and second RS latch circuits at predetermined timing.

14. The step-up/down type power supply circuit according to claim 13, wherein the change-over switch connects the output of the comparator to the first RS latch circuit when the switch is turned on.

15. The step-up/down type power supply circuit according to claim 13, wherein the clock signal is supplied to the first RS latch circuit, and wherein an output signal of the first RS latch circuit is used as the driving pulse signal of the step-up switching circuit.

16. The step-up/down type power supply circuit according to claim 13, wherein the first RS latch circuit outputs an inverted output and a non-inverted output, wherein the inverted output is used as the driving pulse signal of the step-up switching circuit, and wherein the non-inverted output is used as a control signal of the switch.

17. The step-up/down type power supply circuit according to claim 13, wherein the non-inverted output of the first RS latch circuit is used as a control signal of the change-over switch.

18. The step-up/down type power supply circuit according to claim 13, wherein the clock signal is supplied to the second RS latch circuit, and wherein an output signal of the second RS latch circuit is used as the driving pulse signal of the step-down switching circuit.

19. The step-up/down type power supply circuit according to claim 12, wherein the analog adder adds the current feedback signal, the sawtooth wave signal and the voltage difference signal together when the switch is turned on, and wherein the analog adder adds the current feedback signal and the sawtooth wave signal when the switch is turned off.

20. The step-up/down type power supply circuit according to claim 12, wherein an offset voltage source configured to adjust a threshold for a transition from a step-up operation to a step-up/down operation is connected to an input terminal of the voltage comparator circuit.

* * * * *